US008181981B2

(12) United States Patent
Stenberg

(10) Patent No.: US 8,181,981 B2
(45) Date of Patent: May 22, 2012

(54) VARIABLE GEOMETRY CYCLE FRAME

(76) Inventor: Eric E. Stenberg, Grovertown, IN (US)

( * ) Notice: Subject to any disclaimer, the term of this patent is extended or adjusted under 35 U.S.C. 154(b) by 108 days.

(21) Appl. No.: 12/393,720

(22) Filed: Feb. 26, 2009

(65) Prior Publication Data
US 2009/0212529 A1 Aug. 27, 2009

Related U.S. Application Data

(60) Provisional application No. 61/031,464, filed on Feb. 26, 2008.

(51) Int. Cl.
*B62K 19/00* (2006.01)
(52) U.S. Cl. ........................ 280/281.1; 180/219
(58) Field of Classification Search .................. 180/219; 280/274, 275, 281.1, 279
See application file for complete search history.

(56) References Cited

U.S. PATENT DOCUMENTS

| | | | |
|---|---|---|---|
| 404,832 A | 6/1889 | Goulden | |
| 642,269 A | 1/1900 | Smith | |
| 1,089,647 A | 3/1914 | Johnston | |
| 1,184,321 A | 5/1916 | Chapin | |
| 1,188,168 A | 6/1916 | Genovese | |
| 1,227,634 A | 5/1917 | Lake | |
| 1,535,435 A | 4/1925 | Neracher | |
| 2,233,313 A | 2/1941 | Hazelroth | |
| 2,271,790 A * | 2/1942 | Allin ............................... | 37/416 |
| 2,768,836 A | 10/1956 | Hilber | |
| 3,521,904 A | 7/1970 | Sheffer | |
| 3,655,219 A | 4/1972 | Jacoby | |
| 3,866,946 A | 2/1975 | Robison | |
| 4,082,307 A | 4/1978 | Tait | |
| 4,147,371 A | 4/1979 | Morita et al. | |
| 4,162,797 A | 7/1979 | McBride | |
| 4,378,857 A * | 4/1983 | Andersson ..................... | 180/227 |
| 4,462,634 A | 7/1984 | Hanagan | |
| 4,506,754 A | 3/1985 | Hirano et al. | |
| 4,533,153 A * | 8/1985 | Tsunoda et al. ............... | 280/277 |
| 4,565,384 A | 1/1986 | Dehnisch | |
| 4,600,207 A | 7/1986 | Zosi | |
| 4,624,470 A | 11/1986 | Love | |
| 4,700,963 A | 10/1987 | Burns et al. | |
| 4,909,537 A * | 3/1990 | Tratner .......................... | 280/278 |
| 5,006,072 A * | 4/1991 | Letovsky et al. ............... | 434/61 |
| 5,458,213 A * | 10/1995 | Nakaya et al. ................. | 180/219 |

(Continued)

FOREIGN PATENT DOCUMENTS

DE 444888 5/1927

(Continued)

*Primary Examiner* — Tashiana Adams
(74) *Attorney, Agent, or Firm* — Overhauser Law Offices LLC

(57) ABSTRACT

A system provides for the adjustment of a cycle frame, for example the rake angle, gooseneck height, wheel base, and rear end height of a motorcycle. The system includes a variable length backbone, a variable length downtube, optionally a variable length fork assembly, and optionally a variable height rear end. The length of the backbone, downtube, fork, and height of the rear end can be adjusted, for example, using a linear actuator such as an electro-mechanical ball screw associated with each of the backbone, downtube, fork, and rear suspension. Adjustment of the lengths/heights/angle can be controlled independently of one another and/or in coordination by a controller. The controller comprises a processor, memory, and actuator drive components. The controller can store presets which allow the rider to automatically adjust the variable length components to specific lengths that provide a desired rake angle, gooseneck height, wheel base length, rear end height, or combination thereof.

19 Claims, 18 Drawing Sheets

U.S. PATENT DOCUMENTS

| | | | |
|---|---|---|---|
| 5,584,494 A * | 12/1996 | Krumm | 280/288.1 |
| 5,967,538 A | 10/1999 | Callaluca et al. | |
| 6,283,487 B1 * | 9/2001 | Torre | 280/283 |
| 6,336,647 B1 * | 1/2002 | Iwai et al. | 280/276 |
| 6,786,499 B2 | 9/2004 | Ackley | |
| 7,059,621 B2 * | 6/2006 | Di Blasi et al. | 280/287 |
| 7,111,861 B2 * | 9/2006 | Pender | 280/279 |
| 7,234,558 B2 * | 6/2007 | Toftner | 180/219 |
| 7,267,351 B2 * | 9/2007 | Chamberlain et al. | 280/281.1 |
| 7,438,306 B2 * | 10/2008 | Mrdeza et al. | 280/279 |
| 7,487,854 B2 * | 2/2009 | Christini et al. | 180/224 |
| 7,546,894 B1 * | 6/2009 | Glenn | 180/227 |
| 7,571,787 B2 * | 8/2009 | Saiki | 180/210 |
| 2003/0141696 A1 * | 7/2003 | Chao | 280/287 |
| 2006/0060405 A1 * | 3/2006 | Pender | 180/219 |
| 2006/0064223 A1 * | 3/2006 | Voss | 701/52 |
| 2007/0003910 A1 * | 1/2007 | Kirila | 434/61 |
| 2007/0004488 A1 * | 1/2007 | Kirila | 463/11 |
| 2008/0018076 A1 * | 1/2008 | Lagar | 280/281.1 |
| 2009/0188738 A1 * | 7/2009 | Christini et al. | 180/224 |

FOREIGN PATENT DOCUMENTS

| | | |
|---|---|---|
| DE | 889870 | 7/1953 |
| GB | 562010 | 6/1944 |
| GB | 570439 | 7/1945 |
| GB | 586372 | 3/1947 |

* cited by examiner

VARIABLE GEOMETRY CYCLE FRAME

CROSS-REFERENCE TO RELATED APPLICATIONS

This application claims the benefit of U.S. Provisional Application No. 61/031,464 filed Feb. 26, 2008, which is hereby incorporated by reference.

BACKGROUND

The present disclosure relates to motorized and non-motorized cycles having variable geometry cycle frames, and particularly to an apparatus for adjusting the length, height, and/or angle of a cycle frame component.

Motorized and non-motorized cycles, such as motorcycles, bicycles, and three-wheelers (collectively "cycles") typically have a welded frame that includes a "gooseneck" and one or more downtubes and one or more backbones (referred to respectively in the singular herein, although more than one member may comprise each). The gooseneck, also known as a steering head, typically includes a segment of tubing that is supported by the backbone and downtube. Additionally, the gooseneck typically pivotably supports the front wheel assembly, generally referred to as a fork. The backbone is typically coupled to an upper portion of the gooseneck and typically extends rearward to the seat pan, for example supporting the seat and fuel tank. The downtube is typically coupled to a lower portion of the gooseneck and typically extends downward, for example in front of the engine, and couples with the motor mount. The backbone and downtube typically each have a fixed length.

The rake angle of a cycle is defined as the angle of the steering axis of the front wheel fork relative to an imaginary vertical axis, typically 30 degrees in production cycles. The wheel base of a cycle is defined as the distance between the front and rear wheel axles. The gooseneck height of a cycle is defined as the vertical distance from the road surface to the gooseneck. A combination of the rake angle and gooseneck height contribute to the determination of the wheelbase. A combination of the rake angle, gooseneck height, and wheelbase further contribute to the determination of the style of the cycle and its stability and handling characteristics. For example, a low rider/pro-street style chopper typically has a shorter gooseneck height, smaller rake angle, and shorter wheelbase than that of a tall boy style chopper. A desired combination of frame characteristics may be selected for particular driving conditions or handling performance. For example, a lower gooseneck height and a longer wheel base provide for higher stability such as is desirable for highway driving. Alternatively, a higher gooseneck height and a shorter wheel base provides for more aggressive turning response, for example for city driving.

The rake angle and gooseneck height are determined at least in part by the relative downtube "rise" length and backbone "stretch" length; therefore, to provide a particular rake angle and gooseneck height combination, the characteristics of specific downtube and backbone lengths may be desirable at certain times, while other downtube and backbone lengths may be desirable during different circumstances, for example, depending on driving conditions and rider preference. For example, variations in rider preference make it desirable for a chopper motorcycle to be adjustable from a low rider/pro-street style configuration to a tall boy style configuration. Adjustment of the downtube and backbone lengths can also provide adjustment of the cycle to better accommodate various sizes of riders.

Typically motorcycles have a fixed frame geometry, i.e., the length for the backbone, length for the downtube, wheel base length, gooseneck height, and rake angle. Some motorcycles, known as choppers, are modified with a fixed stretch to the backbone length, fixed rise to the downtube length, and fixed increase in the rake angle. Thus, typical choppers have an altered, but fixed, frame geometry.

Some prior configurations for have allowed for the adjustment of the rake angle but have not allowed for adjustment of the length of both the downtube and backbone, thereby independently varying the rake angle and gooseneck height. In addition, while prior configurations have altered a stock style motorcycle to a chopper, they do not allow one type of chopper to be changed to another type of chopper, for example, from a low rider/pro-street style chopper to a tall boy style chopper. Additionally, while some prior configurations have used pneumatic systems for adjusting the rake angle, with pneumatically operated rake angle adjustment, a loss of air pressure can cause the cycle to "nose-dive," causing an unsafe condition that can lead to an accident.

SUMMARY

The present invention may comprise one or more of the features recited in the attached claims, and/or one or more of the following features and combinations thereof.

An illustrative system for adjusting a cycle's frame geometry includes a variable length backbone, a variable length downtube, and a controller for adjusting the backbone and downtube lengths. The height of a cycle's gooseneck and/or its rake angle are set by adjusting one or both of the backbone and downtube lengths, for example adjusting the rake angle between about 30 and 70 degrees, increasing the downtube rise by about 6 inches and the backbone stretch by about 4 inches. The length of the backbone can be adjusted, for example, using a linear actuator such as an electromechanical ball screw associated with the backbone. Similarly, the length of the downtube can be adjusted, for example, using a linear actuator such as an electromechanical ball screw associated with the downtube. Advantageously, the length of the downtube and backbone will be maintained even in the event electric power is lost because the ball screws associated with the downtube and backbone will maintain their position in such an event. The system may additionally or alternatively include a front wheel fork having an adjustable length, for example, using a ball screw associated with the fork. The system may additionally or alternatively include an adjustable rear suspension or swing-arm component, for example for adjusting the rear/seat height, for example, using an actuator such as a ball screw associated with the rear suspension or swing arm. Adjustment of the ball screws and the resulting changes to the downtube rise, backbone stretch, fork length, and rear suspension/swing-arm can be controlled independently of one another, and if desired in coordination with one another, by the system's controller. With actuation of a user input device, the controller may allow independent adjustment of each actuator, coordinated adjustment of actuators, and stored frame geometry presets.

The system may be adapted for use with cycle frames during original manufacturing or, additionally or alternatively, adapted for modifying existing cycle frames. For example, portions of the cycle frame can be cut out to insert variable length portions, for example a portion of or the entire downtube and a portion of or the entire backbone, each including one or more linear actuators and optionally one or more linear bearings.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

Figure 1:
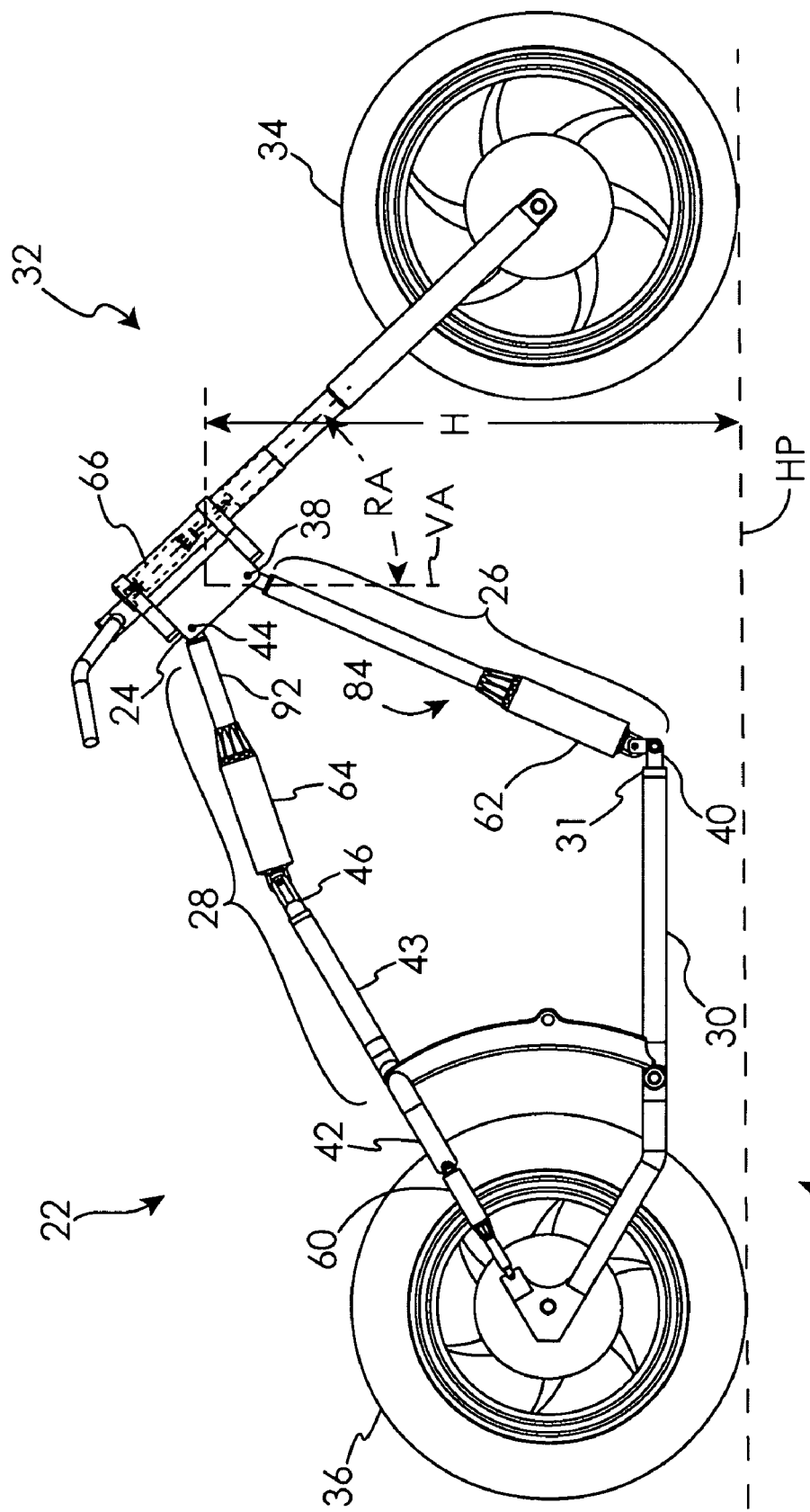
FIG. 1 is a side perspective view of a first illustrative embodiment of a motorcycle frame having an adjustable backbone, an adjustable downtube, and an adjustable fork according to the present disclosure.

For the purposes of promoting and understanding the principals of the invention, reference will now be made to one or more illustrative embodiments illustrated in the drawings and specific language will be used to describe the same.

Referring to FIG. 1, a first illustrative embodiment of a cycle, in this case a motorcycle 20, includes a frame 22 comprising a gooseneck 24, a downtube 26, a backbone 28, and engine support 30. The motorcycle 20 also includes a front fork assembly 32, front wheel 34, and rear wheel 36. The front fork assembly 32 is pivotably supported by the gooseneck 24, thus providing front wheel steering for the motorcycle 20.

The downtube 26 extends between a lower portion of the gooseneck 24 and a forward portion of engine support 30. The downtube 26 is pivotably coupled to the gooseneck 24, for example at pivot point 38. The downtube 26 may also be pivotably coupled to the engine support 30, for example by a frame adaptor 40 coupled to a forward terminal end 31 of the lower rear portion of the cycle frame. The backbone 28 extends between an upper portion of the gooseneck 24 and the frame rear end 42. The backbone 28 is pivotably coupled to the gooseneck 24, for example at pivot point 44. The backbone 28 may also be pivotably coupled to the frame rear end 42, for example by a frame adaptor 46 coupled to a forward terminal end 43 of an upper rear portion of the cycle frame. The frame adaptors 40 and 46 can be welded, bolted, or otherwise fixed to the frame 22.

The downtube 26 and backbone 28 each include one or more adjustable portions, including actuators 62 and 64, respectively, for example a linear actuator such as a ball screw, however other actuators may be utilized. In some embodiments, the adjustable portions of downtube 26 and backbone 28 transmit the entire load between the gooseneck 24 and the rear of frame 22, thus any other mechanical connection between the gooseneck 24 and the rear of the frame 22 are non-structural members such as finish components. In some embodiments the downtube 26, backbone 28, gooseneck 24, and rear of the bike frame 22 are each connected with pivoting joints, thus forming a four-bar linkage. Unlike a suspension system in which the bars are parallel to allow free range of motion, in the presently disclosed system the backbone 28 and downtube 26 form can be arranged to form a trapezoid, which provides desired rigidity and stability. Pre-loading provided by the weight of the rider and machine, which combined will be around 900-1000 lbs, in combination with the leverage of the front fork 32 acting upon it and the suspension on the front fork, is believed to provide a very stable system. In other embodiments of the frame 22, the only three of the connecting points between the downtube 26, backbone 28, gooseneck 24, and rear of the frame 22 (e.g. at terminal ends 31 and 43) are pivotable joints, the forth being a rigid connection, for example, one of the downtube 26 and backbone 28 rigidly connected with the rear of the frame 22. Additionally or alternatively, in some embodiments of the frame 22, one of the downtube 26 and backbone 28 lacks the adjustable length portion and is of fixed length.

The fork 32 may also optionally include one or more actuators 66, for example a linear actuator such as a ball screw. The frame rear end 42, for example the rear suspension or swing arm, may also optionally include an actuator 60, for example a linear actuator such as a ball screw. The linear actuators 60, 62, 64, and 66 provide each of downtube 26, backbone 28, fork 32, and frame rear end 42 independent extension and retraction in length, thereby altering the configuration of the frame 22 of the motorcycle 20. In some embodiments, only one of the downtube 26 and the backbone 28 include an adjustable portion while the other is of fixed length though may be pivotably coupled to the frame 22 and/or gooseneck 24.

The height H of the gooseneck, the wheelbase, and the rake angle RA of the motorcycle 20 are changed by extending or retracting the length of the downtube 26, backbone 28, fork 32, or any combination thereof. The height H of the gooseneck 24 is defined as distance between the gooseneck 24 and a horizontal plane HP extending between the bottom of the front tire 34 and the bottom of the rear tire 36. The wheelbase is defined as the distance between the front and rear wheels 34 and 36. The rake angle is defined as the angle RA between the fork 32 (or gooseneck 24) and an imaginary vertical axis or plane VA passing through the fork 32 (or gooseneck 24).

Figure 2A:
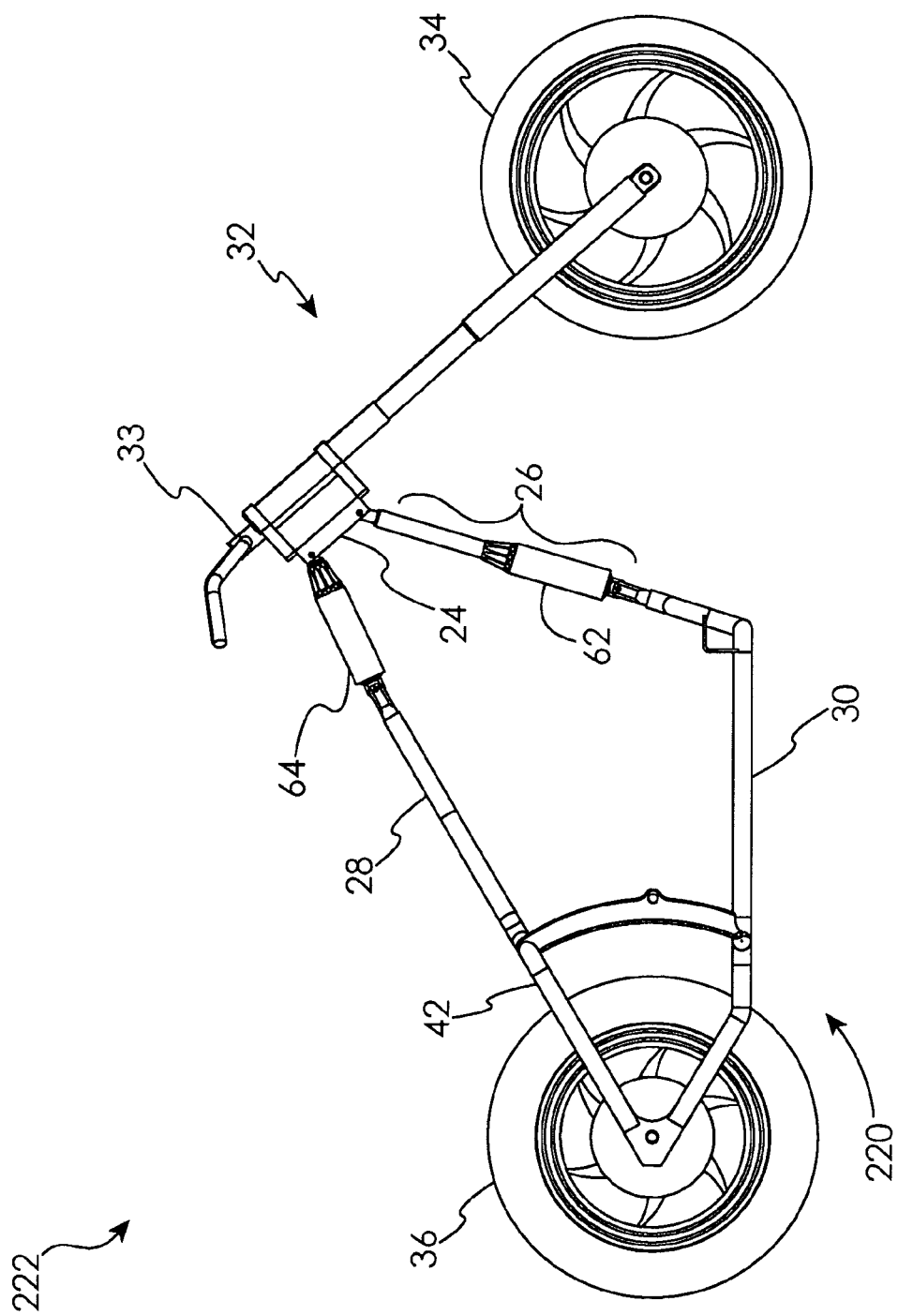
FIG. 2A is a side perspective view of a second illustrative embodiment of a motorcycle frame having an adjustable backbone and an adjustable downtube according to the present disclosure.
Figure 2B:
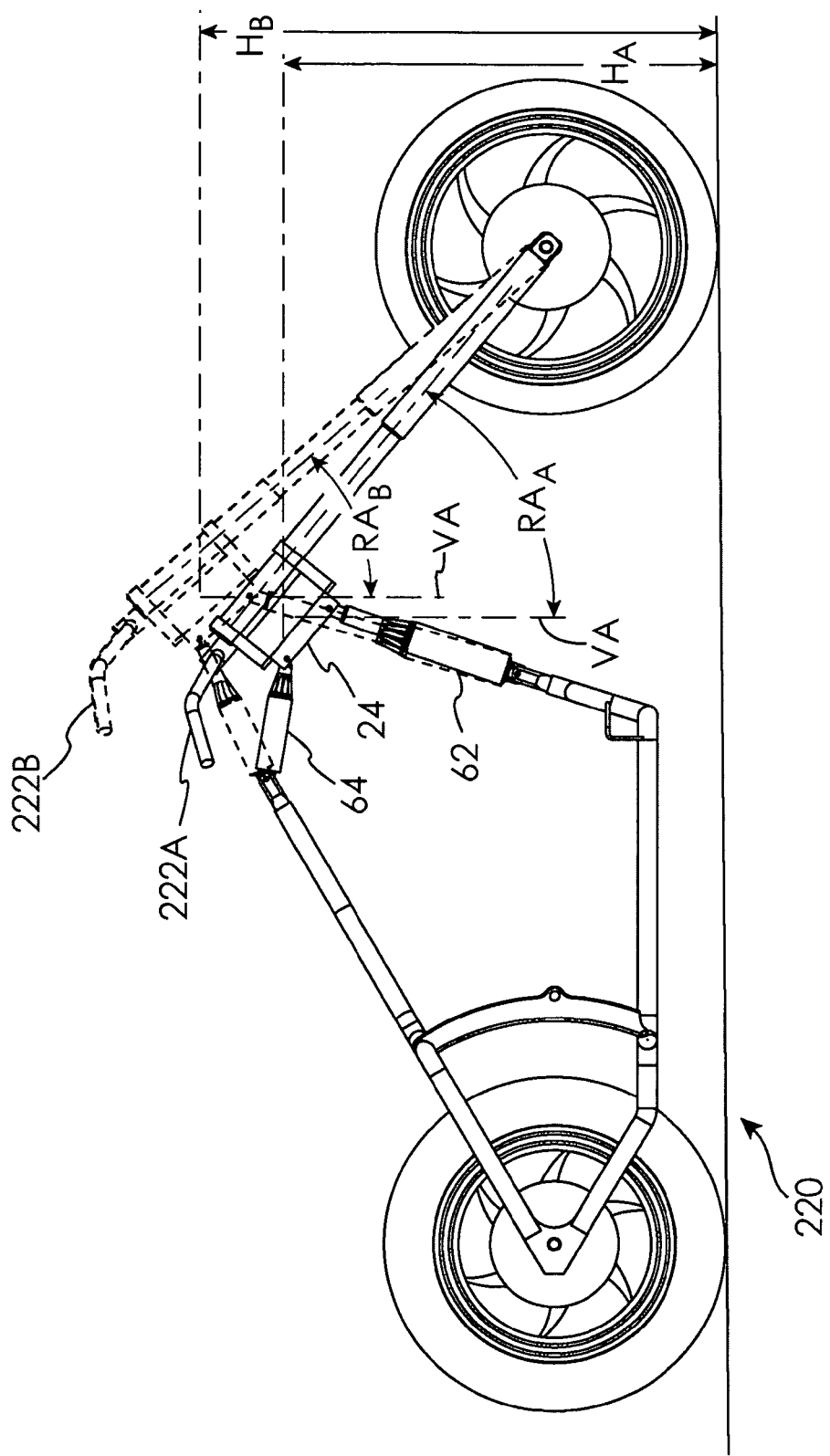
FIG. 2B is a side perspective view of the second illustrative embodiment of FIG. 2A, shown in two different positions based on adjustment of the gooseneck height and rake angle according to the present disclosure.

FIG. 2A shows a second illustrative embodiment of a motorcycle 220 having frame 222 with a backbone 28 including a linear actuator 64 and a downtube 26 including a linear actuator 62. FIG. 2B shows the motorcycle 220 in two illustrative frame geometries or configurations 222A and 222B. Adjustment of actuators 62 and 64 alters the lengths of downtube 26 and backbone 28, thereby translating the frame 222 between frame configurations 222A and 222B, or to a frame geometry in between configurations 222A and 222B. As illustrated, gooseneck height $H_A$ and rake angle $RA_A$ are associated with frame configuration 222A, and gooseneck height $H_B$ and rake angle $RA_B$ are associated with frame configuration 222B.

Figure 3A:
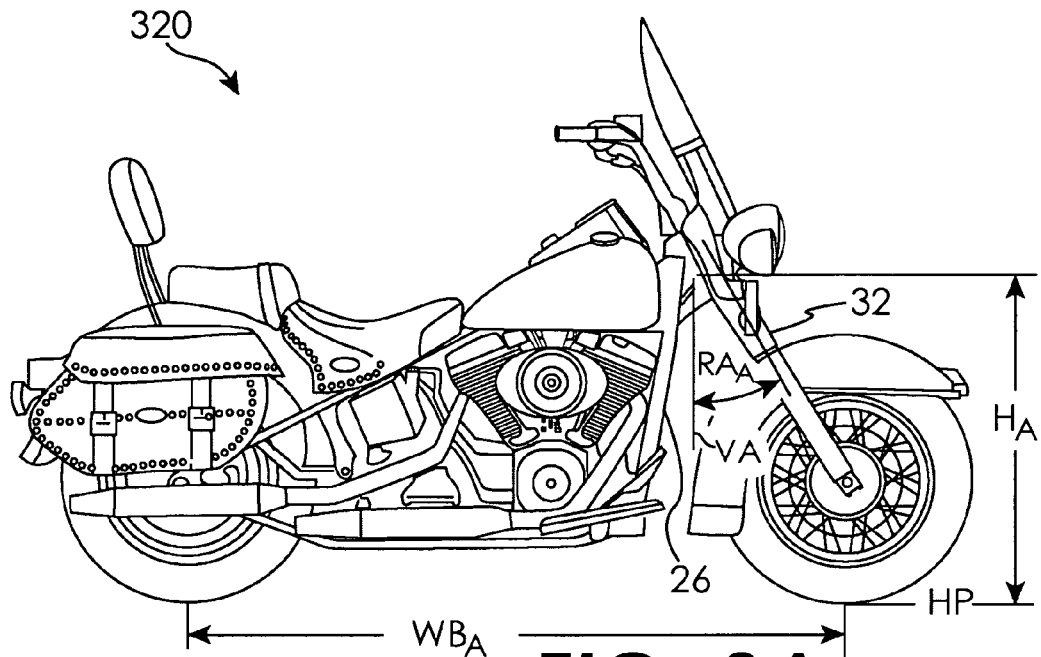
FIG. 3A illustrates a first gooseneck height/rake angle combination of a third illustrative embodiment incorporated into a complete motorcycle.
Figure 3B:
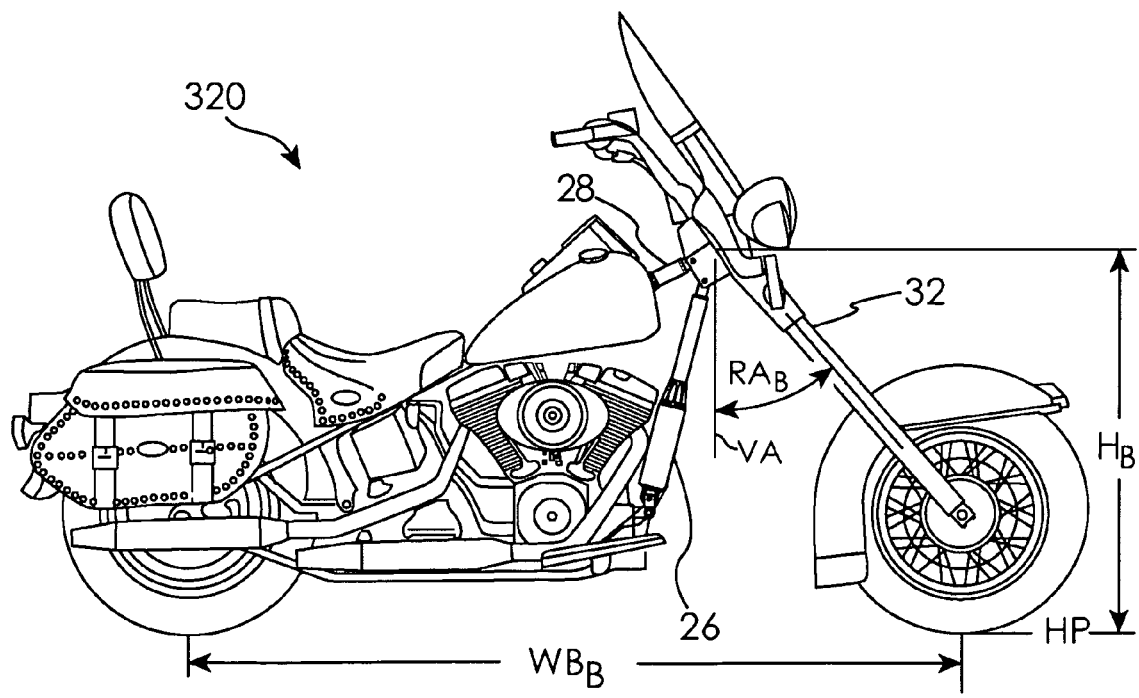
FIG. 3B illustrates a second gooseneck height/rake angle combination of the motorcycle of FIG. 3A.

FIGS. 3A and 3B each depict a third illustrative embodiment of a motorcycle 320, which is comprised of a fully assembled motorcycle that incorporates adjustable length frame components, including downtube 26, backbone 28, and fork 32. FIG. 3A illustrates the motorcycle 320 in a configuration with the downtube 26, backbone 28, and fork 32 each adjusted to lengths shorter than their relative lengths as illustrated by the configuration of the motorcycle in FIG. 3B. As a result, the rake angle $RA_A$, gooseneck height $H_A$, and wheel base $WB_A$ of FIG. 3A are changed to rake angle $RA_B$, gooseneck height $H_B$, and wheel base $WB_B$ in FIG. 3B. The backbone 28 in FIG. 3A is not visible in the illustration because it is concealed by other components of the motorcycle 320.

Figure 4A:
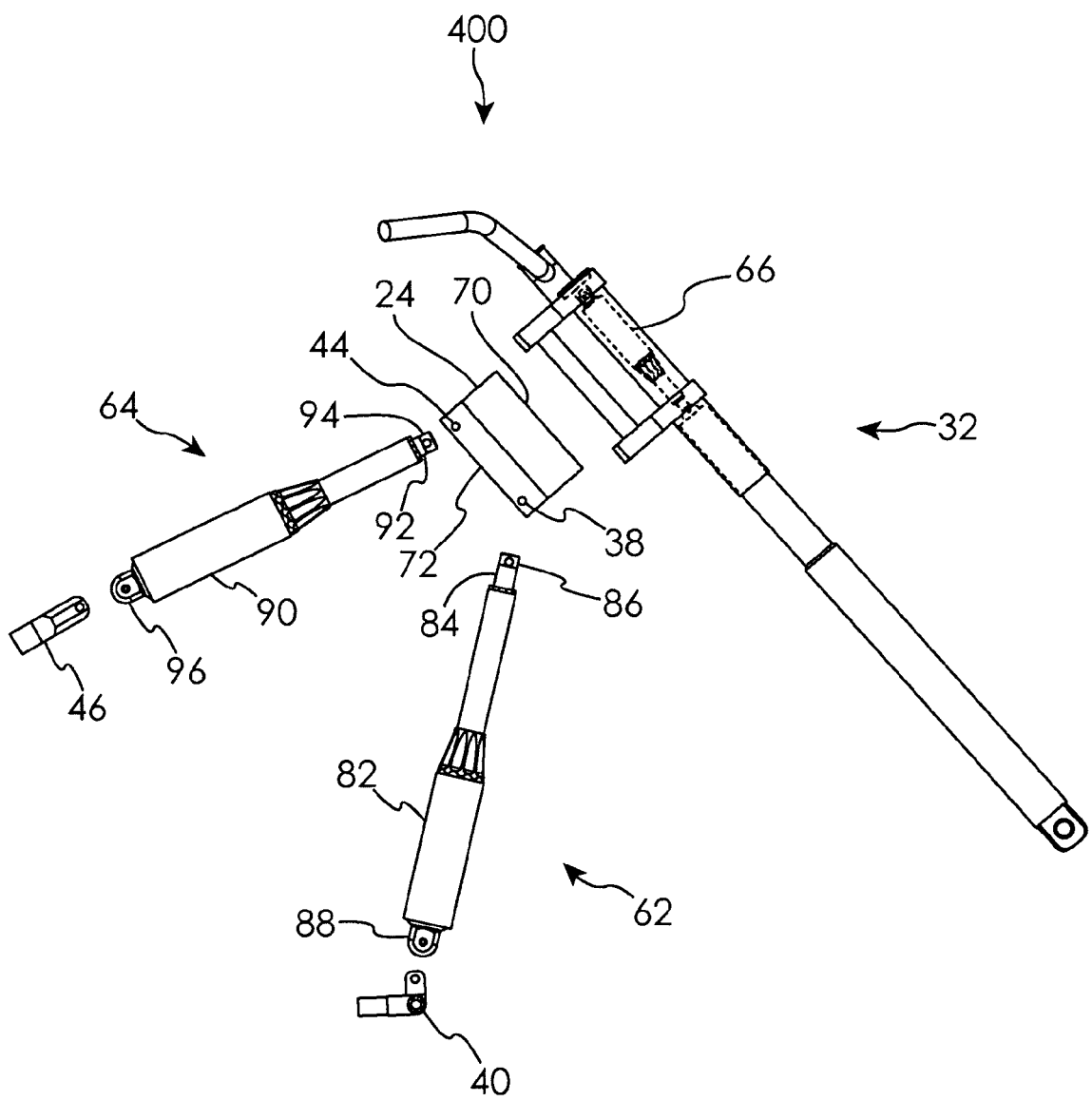
FIG. 4A shows an exploded view of a first illustrative embodiment of a system for modifying a motorcycle according to the present disclosure, having an adjustable length backbone and an adjustable length down tube.

FIG. 4A shows an illustrative embodiment of a system 400 for modifying a motorcycle according to the present disclosure. The system 400 may include, for example, one or more of the following components: a gooseneck 24, a downtube actuator 62, a downtube frame adaptor 40, a backbone actuator 64, a backbone frame adaptor 46, an adjustable fork assembly 32, a rear suspension actuator 60, and an adjustable rear end 42. The system 400 may be incorporated into an existing cycle such as motorcycle 20 by cutting or otherwise removing a portion of or the complete length of the downtube 26 and backbone 28 in order to incorporate the components of system 400. Additionally or alternatively, system 400 can be incorporated into a frame during original manufacturing.

Figure 6:
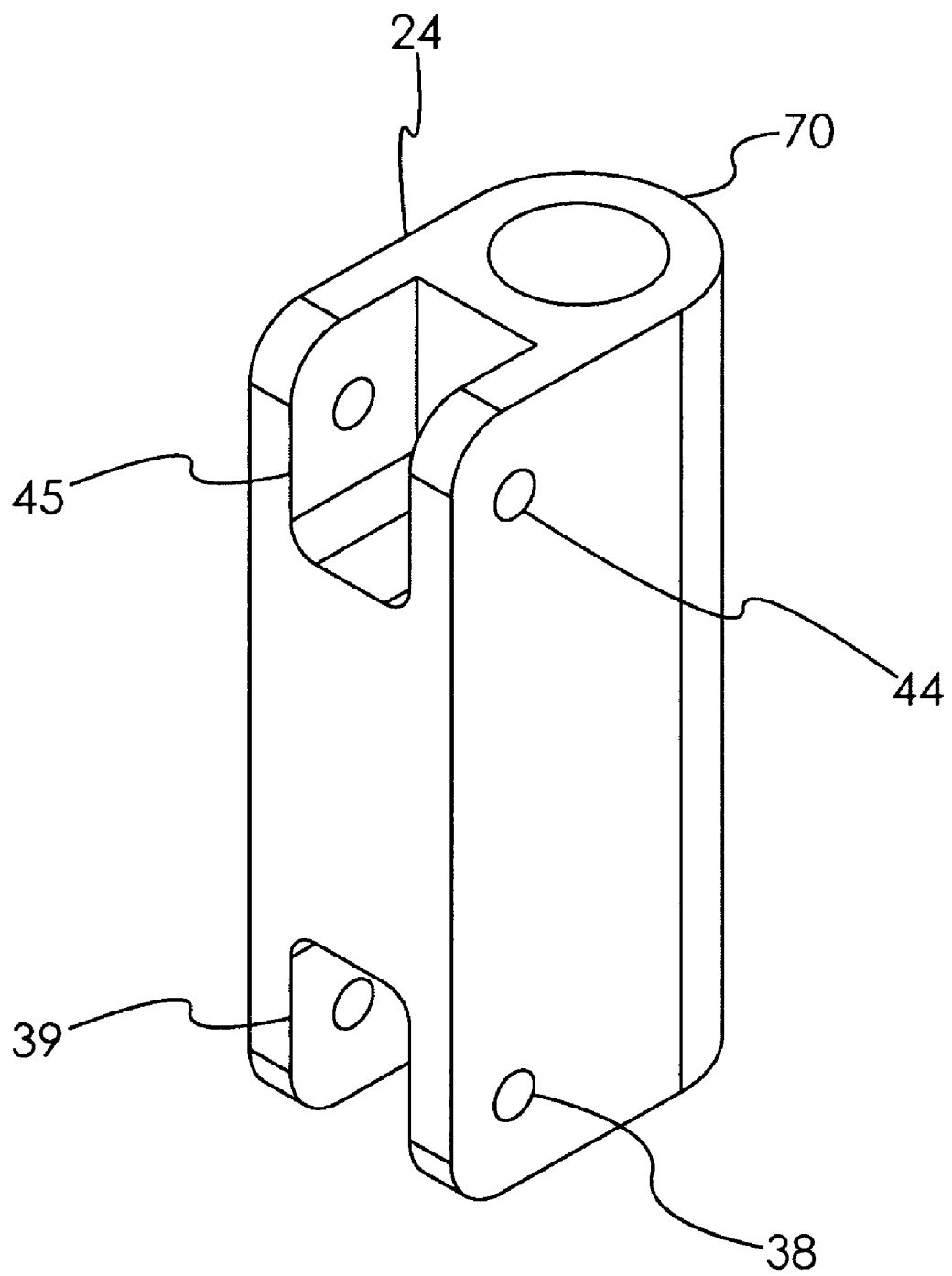
FIG. 6 shows an illustrative embodiment of the gooseneck adapted for pivotably coupling with the downtube and backbone.

Referring to FIGS. 4A and 6, the adjustable fork assembly 32 is typically pivotably coupled to the sleeve 70 portion of the gooseneck 24. For example, the sleeve 70 may include bushings, bearings, or the like for pivotably coupling the fork 32, thus accommodating front wheel steering.

Figure 4B:
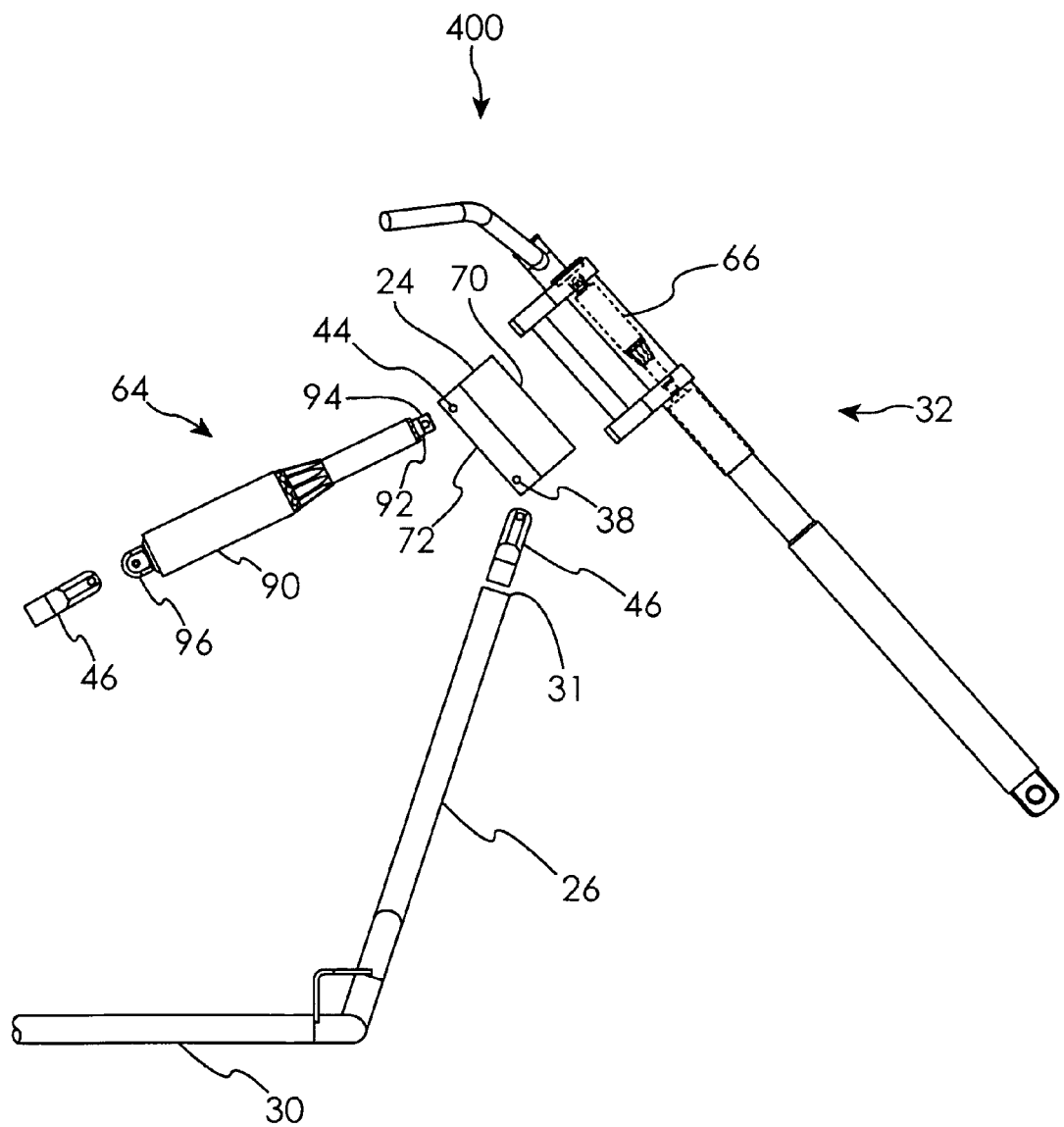
FIG. 4B shows an exploded view of a second illustrative embodiment of a system for modifying a motorcycle according to the present disclosure, having an adjustable length backbone and fork and a fixed length down tube.

FIG. 4B shows an exploded view of a second illustrative embodiment of a system 410 for modifying a motorcycle. The system 410 includes an adjustable length backbone 28 and fork 32, but a fixed length downtube 26 that is pivotably coupled with the gooseneck 24. The system 410 may include, for example, one or more of the following components: a gooseneck 24, a downtube adaptor 46, a backbone actuator 64, a backbone frame adaptor 46.

Figure 4C:
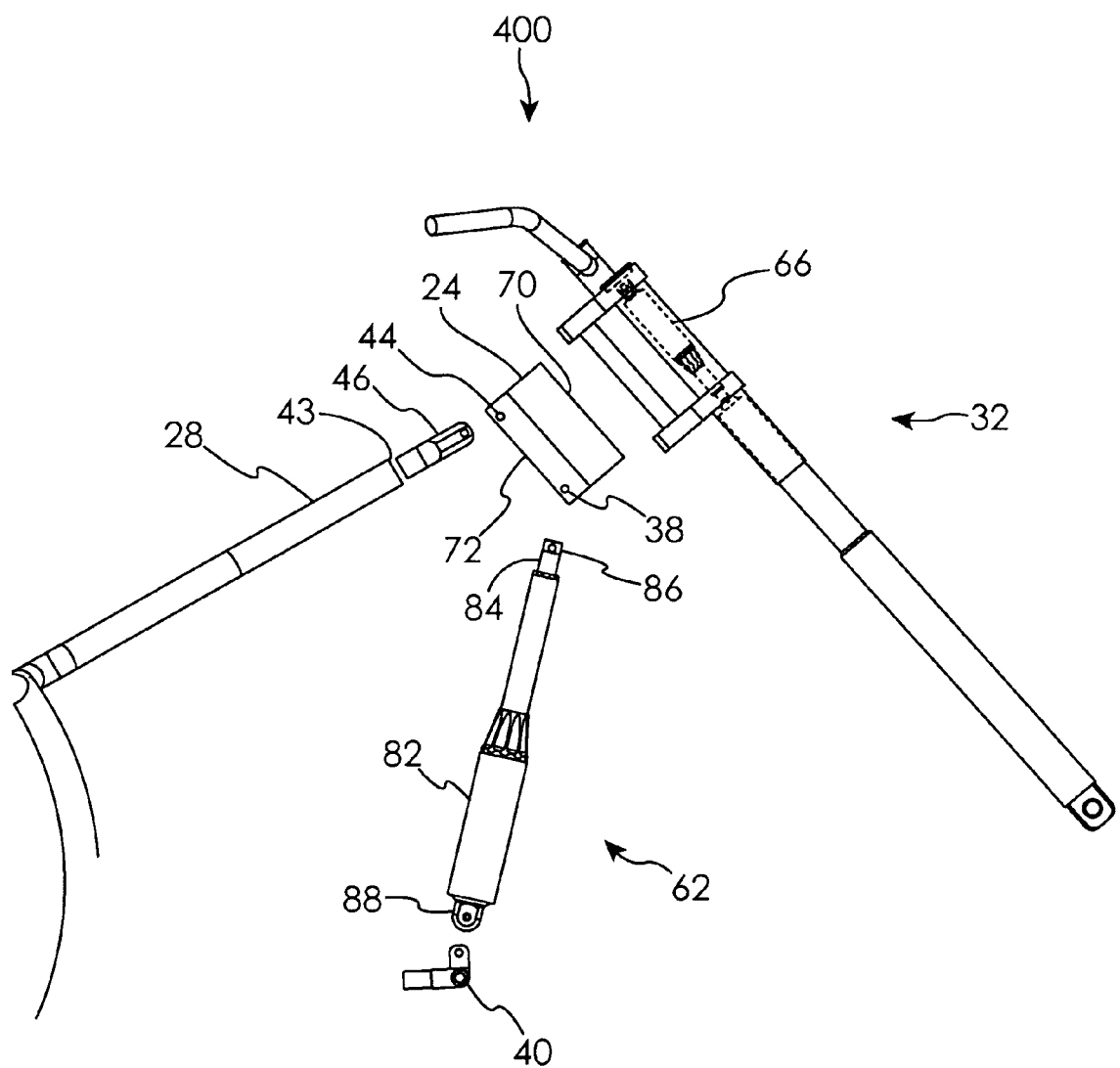
FIG. 4C shows an exploded view of a third illustrative embodiment of a system for modifying a motorcycle according to the present disclosure, having a fixed length backbone and fork and a adjustable length down tube.

FIG. 4C shows an exploded view of a third illustrative embodiment of a system 420 for modifying a motorcycle. The system 420 includes and adjustable length downtube 26 and fork 32, but a fixed length backbone 28 that is pivotably coupled with the gooseneck 24. The system 420 may include, for example, one or more of the following components: a gooseneck 24, a downtube actuator 62, a downtube frame adaptor 40, a backbone adapter 46, an adjustable fork assembly 32, a rear suspension actuator 60, and an adjustable rear end 42.

Figure 5A:
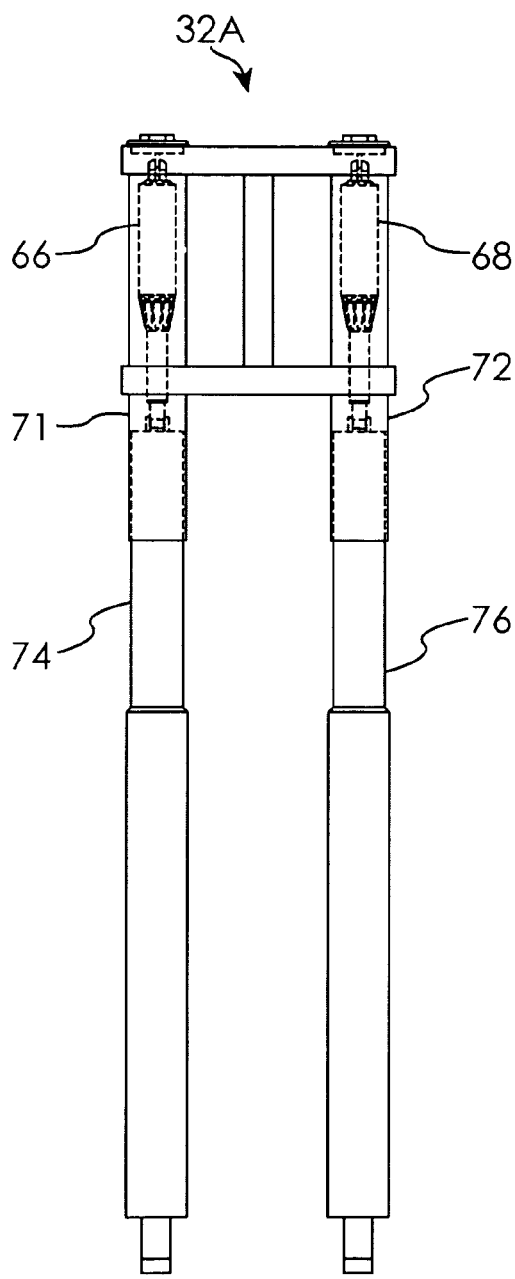
FIG. 5A shows an illustrative embodiment of the adjustable fork assembly comprising two ball screws incorporated inside of the two fork tubes.

FIG. 5A shows a first illustrative embodiment of an adjustable fork assembly 32A, including two linear actuators 66 and 68. For example, the linear actuators 66 and 68 can be electromechanical ball screws incorporated inside of the two upper fork tubes 71 and 72 and coupled to extend and retract within upper fork tubes 71 and 72 the lower fork tubes 74 and 76, thus selectively increasing or decreasing the length of the fork 32A.

Figure 5B:
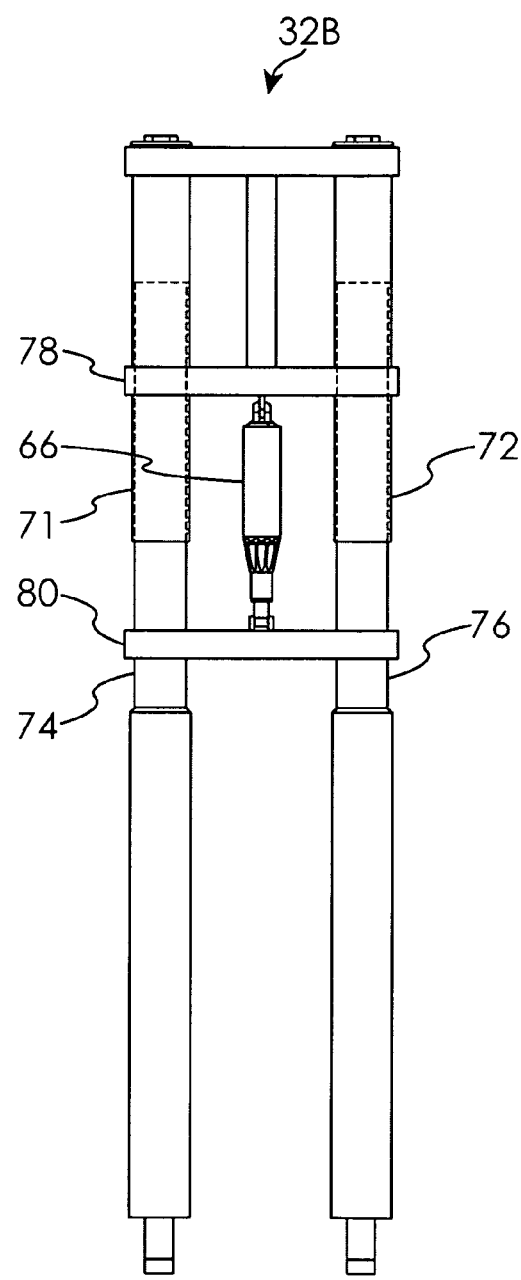
FIG. 5B shows an illustrative embodiment of the adjustable fork assembly comprising one ball screw located between the two fork tubes.

FIG. 5B shows a second illustrative embodiment of an adjustable fork assembly 32B, including linear actuator 66. For example, the linear actuator 66 can be an electro-mechanical ball screw coupled between a cross-member 78 and a cross-member 80. Cross-member 78 couples the two upper fork tubes 71 and 72 and cross-member 80 couples lower fork tubes 74 and 76; therefore, actuating linear actuator 66 extends or retracts lower fork tubes 74 and 76 within upper fork tubes 71 and 72, thus selectively increasing or decreasing the length of the fork 32B.

Referring again to FIGS. 4A and 6, the downtube actuator 62 may include a housing 82, a rod 84, and two mounting points on opposite ends, for example an eyelet 86 and a yoke 88. The length of the rod 84 extending from the housing 82 is generally adjustable, for example by selectively driving an electric motor coupled to an internal ball screw mechanism (not shown). The eyelet 86 is pivotably coupled to the lower pivot point 38 of the gooseneck 24. For example, the lower pivot point 38 may be a pair of coaxial bores defined through two flanges 72, thus forming a clevis for receiving eyelet 86 and a fastener such as a pin or a bolt therethrough. To facilitate pivotably coupling the pivot point 38 and receiving notch 29 may be lubricated, for example, including oil impregnated sleeves or bearings press fit within the gooseneck 24. The backbone actuator 64 may similarly include a housing 90, a rod 92, and two mounting points on opposite ends, for example an eyelet 94 and a yoke 96. The length of the rod 92 extending from the housing 90 is also generally adjustable, for example by selectively driving an electric motor coupled to an internal ball screw mechanism (not shown). The eyelet 94 is pivotably coupled to the lower pivot point 44 of the gooseneck 24. The pivot point 44 and receiving notch 45 can have the same features as pivot point 38 and receiving 39 described above.

Figure 9:
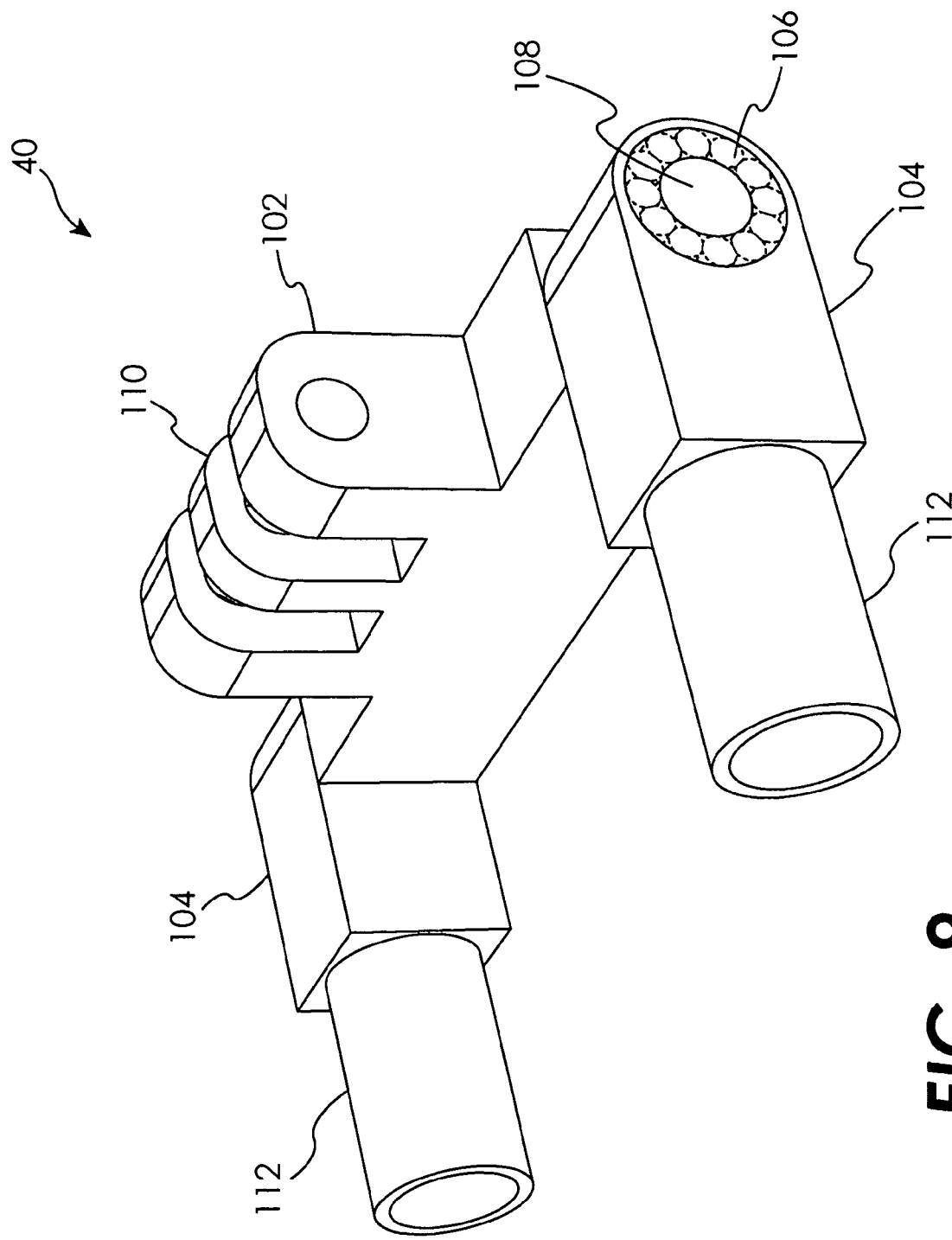
FIG. 9 shows an illustrative embodiment of a frame adaptor clevis for coupling the downtube ball screw to a cycle frame having two downtubes or engine support tubes.

Referring to FIGS. 1, 4, and 9, the lower frame adaptor 40 couples the downtube actuator 62 to the frame 22, for example, to the engine support 30 as shown in FIG. 1. Referring now to FIG. 9, the illustrative lower frame adaptor 40 can include a first end 102 for coupling to the downtube actuator 62 and a second end 104 for coupling to the frame 22. The first end 102 may include, for example, a clevis 110 for receiving the yoke 88 of the downtube actuator 62 and a suitable securing pin, bolt, or other fastener. The second end 104 may include, for example, bosses 112 for welding within the ends of dual tubes of engine support 30. The first end 102 and the second end 104 may be fixed to one another, or optionally pivotably coupled, for example by needle bearings 106 and associated shafts 108.

Figure 10:
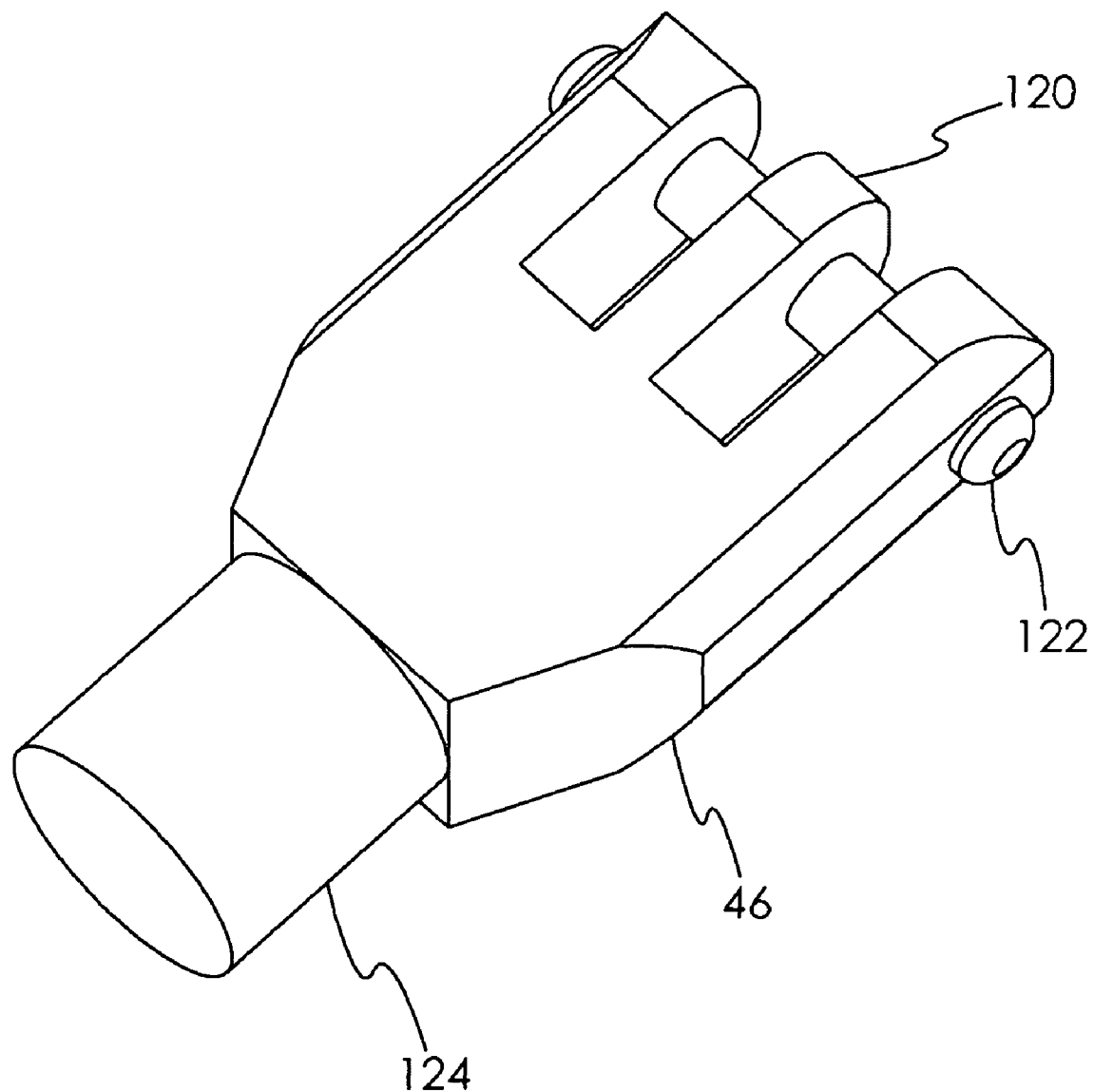
FIG. 10 shows an illustrative embodiment of a frame adaptor clevis for coupling a backbone ball screw to a cycle frame having a single backbone tube.

FIG. 10 shows an illustrative backbone frame adaptor 46 for coupling the backbone actuator 64 to the backbone 28 or rear end 42 of the frame 30. Clevis 120 couples to the downtube actuator 64, for example the yoke 96 shown in FIG. 4A and retained by a suitable fastener such as pin 122. The clevis 120 may comprise other configuration depending on the configuration of the component it is coupling to, for example, one opening rather than two. A boss 124 can adapted to be welded or otherwise fastened to an end portion the frame 22, for example, the rear end 42. For example, the boss 124 may be sized to be received with an end tube portion of the rear end 42.

Figure 7:
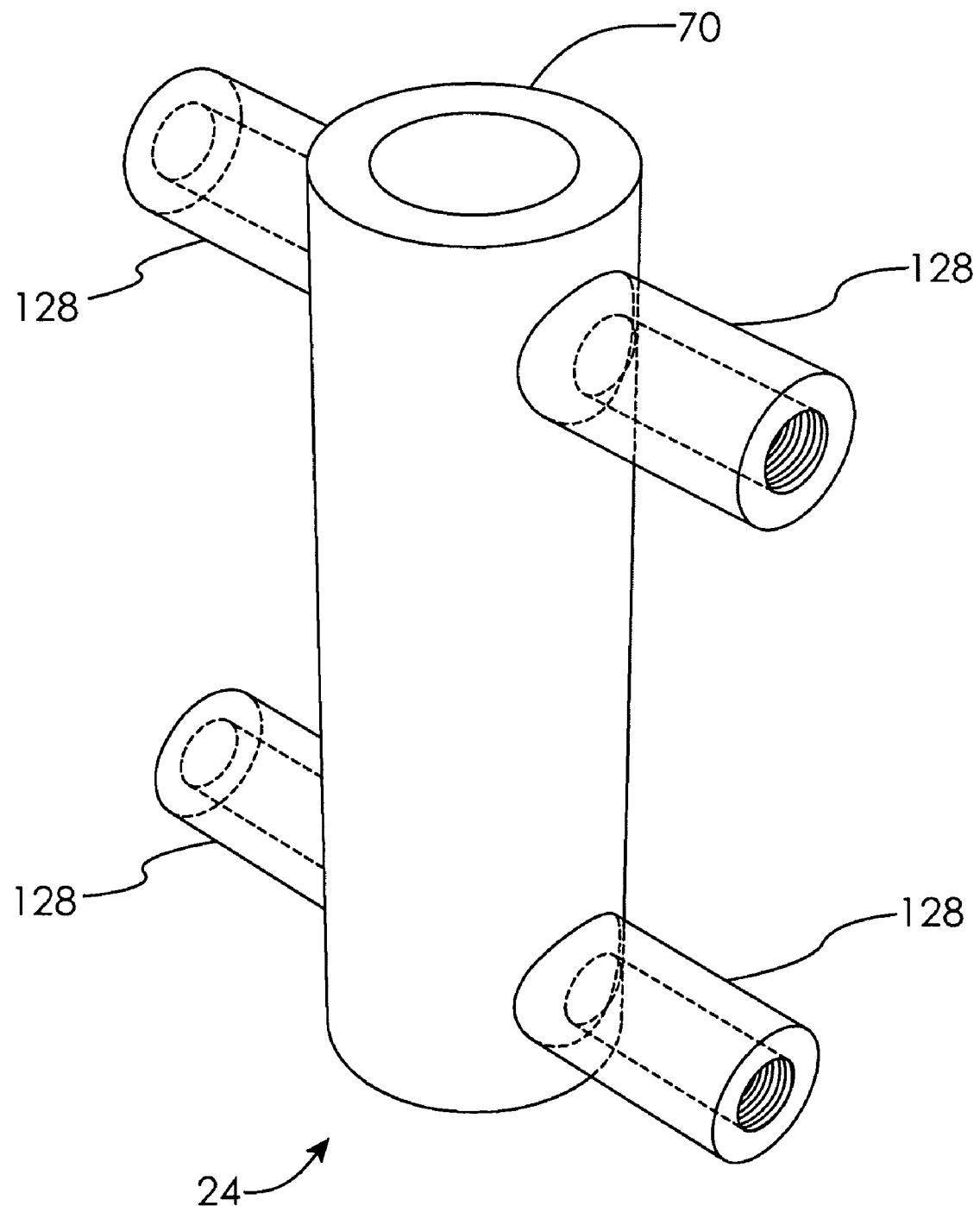
FIG. 7 shows an illustrative embodiment of a gooseneck having boss pivot points for coupling with the downtube and backbone.

FIG. 7 shows an alternative embodiment of the gooseneck 24 having bosses 128 for coupling the downtube 26 and the backbone 28 to the sleeve 70. For example, the bosses may be a hardened lubricated metal for coupling with an appropriate receptacle associated with the downtube 26 and the backbone 28. The gooseneck 24 can be machined from a solid piece of steel, or alternative fabrications. The ends of the bosses 128 can be drilled and tapped and a sleeve with needle bearings slide over the bosses in order to provide a means of pivotably coupling downtube 26, backbone 28, or their associated actuators 62 and 64 with the gooseneck 24.

Figure 8:
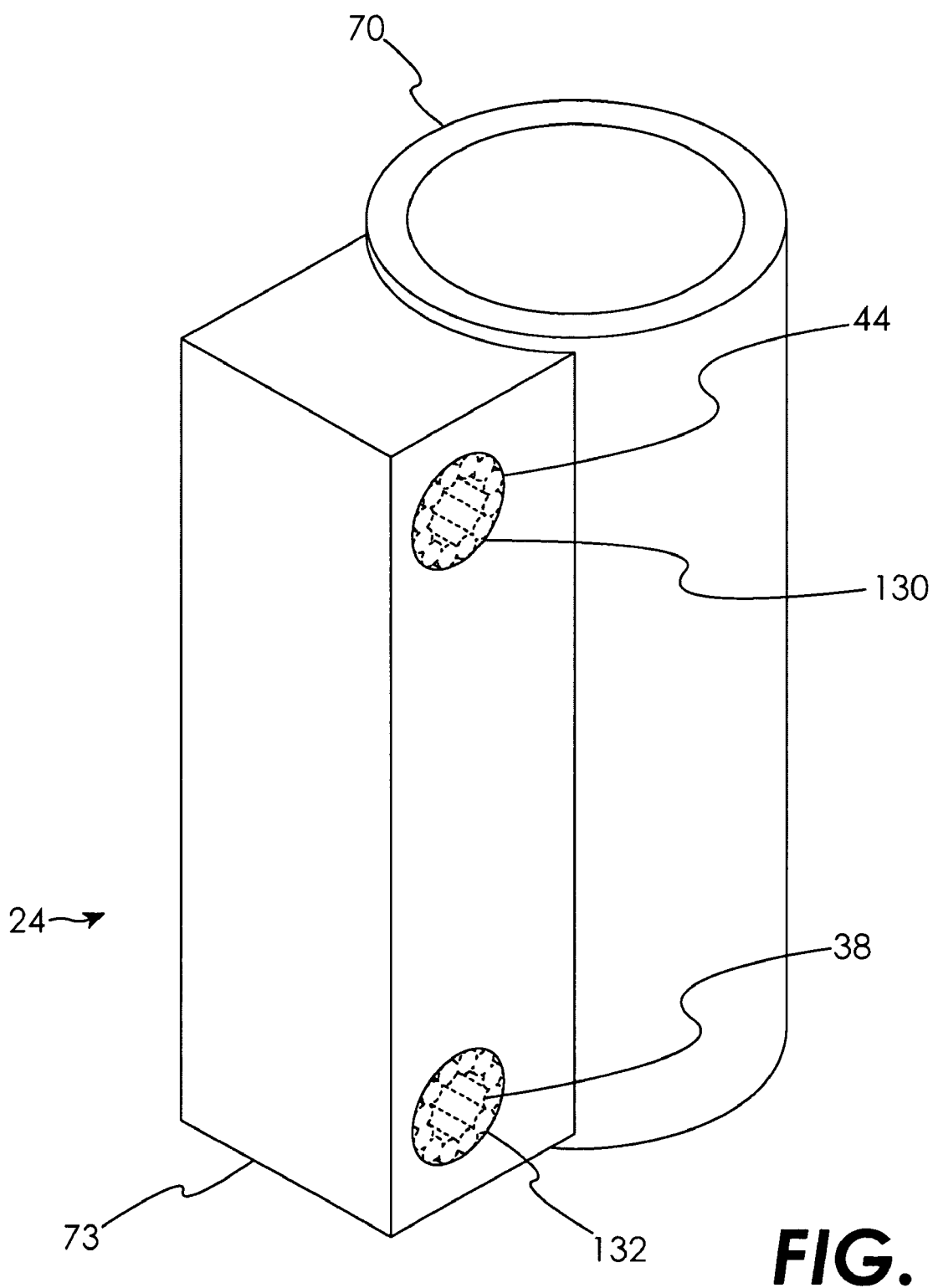
FIG. 8 shows an illustrative embodiment of the gooseneck having needle bearing pivot points for coupling with the downtube and backbone.

FIG. 8 shows another alternative embodiment of the gooseneck 24 having sleeve 70, a single flange 73, and pivot points 38 and 44 defined in flange 73, which may include, for example, needle bearings 130 and 132. The needle bearings 130 and 132 provide an enhanced pivotable coupling between gooseneck 24 and the downtube 26 and the backbone 28.

Figure 11A:
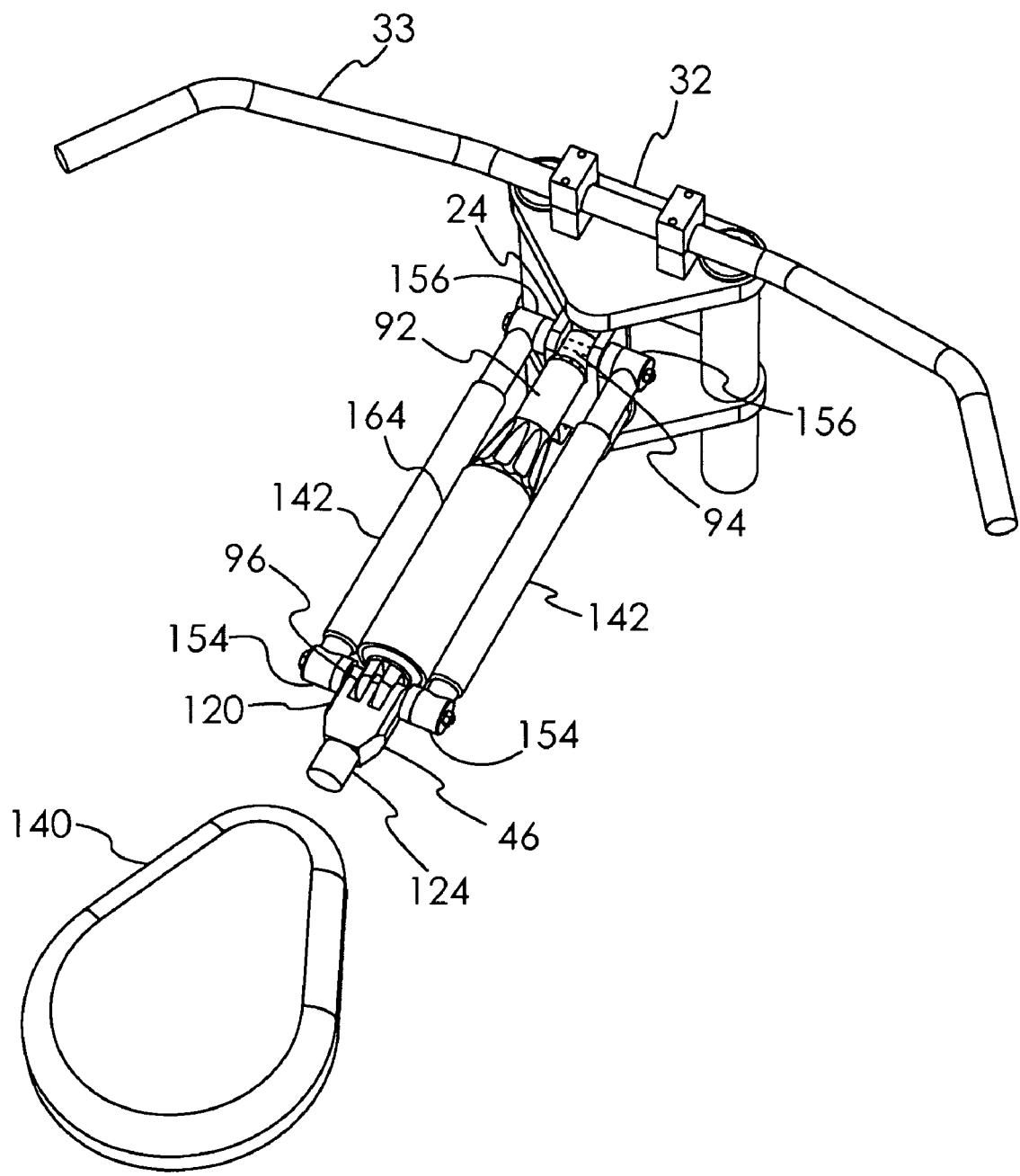
FIG. 11A is a top view of an illustrative embodiment of motorcycle frame having an adjustable backbone with linear bearing supports.
Figure 11B:
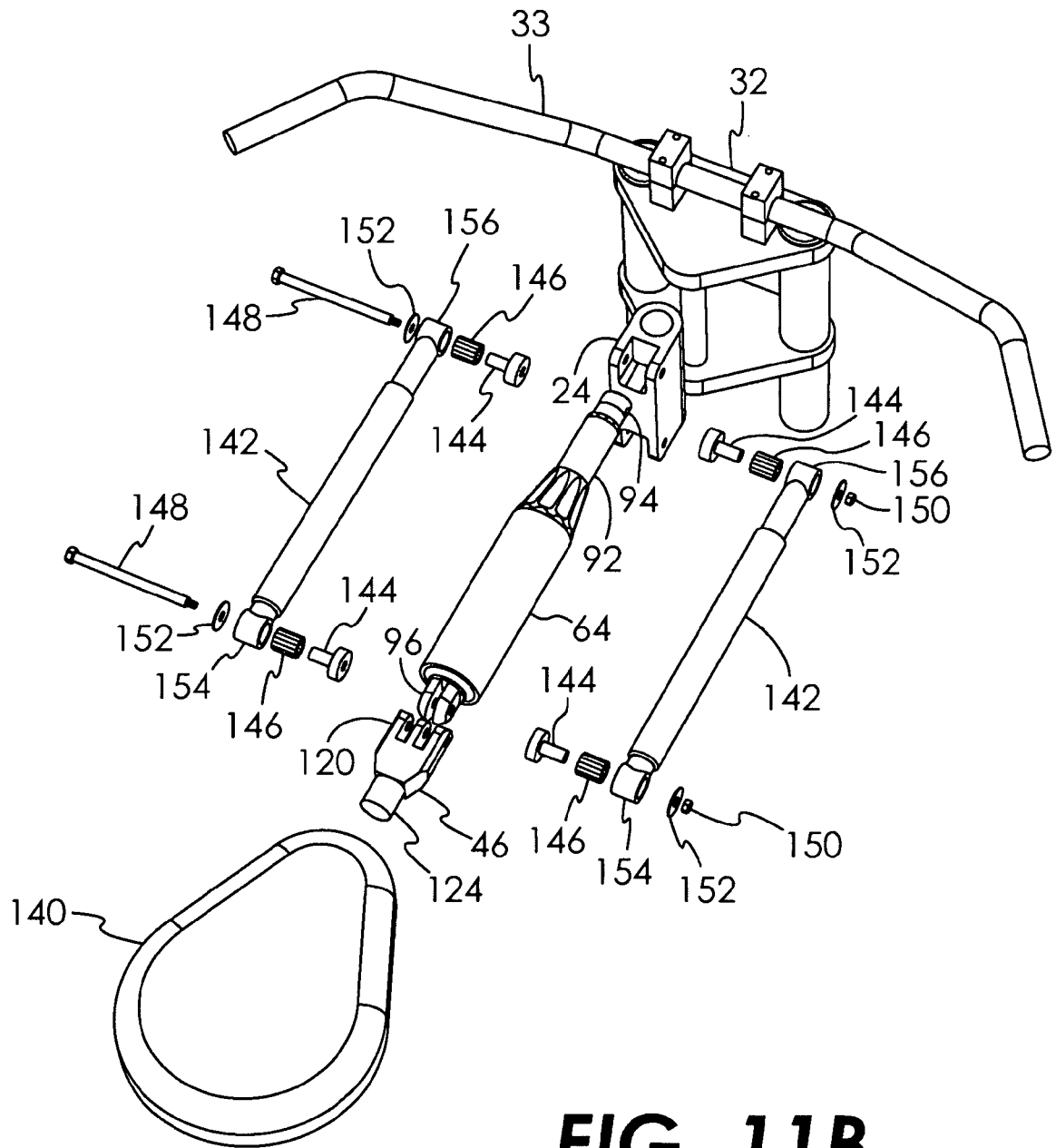
FIG. 11B is an exploded view of the adjustable backbone with linear bearing supports of FIG. 11A.
Figure 12A:
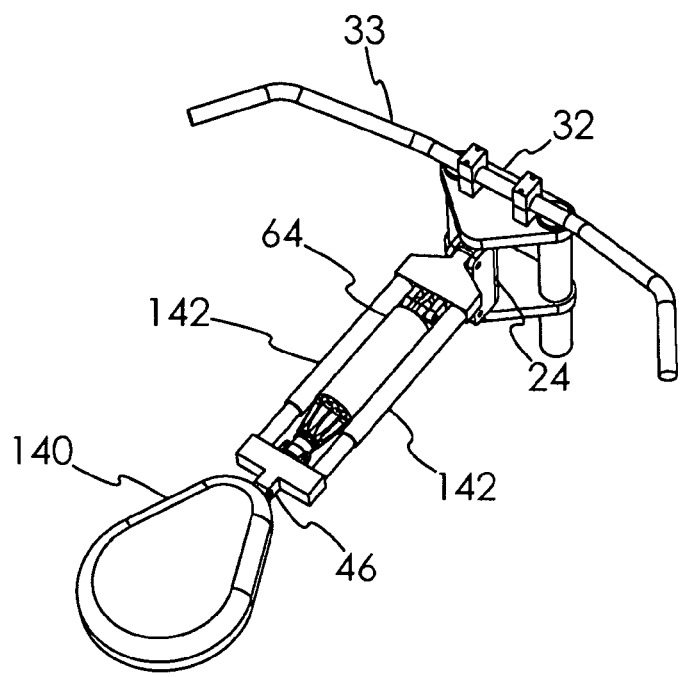
FIG. 12A is a top view of the adjustable backbone of FIG. 11A in a retracted position.
Figure 12B:
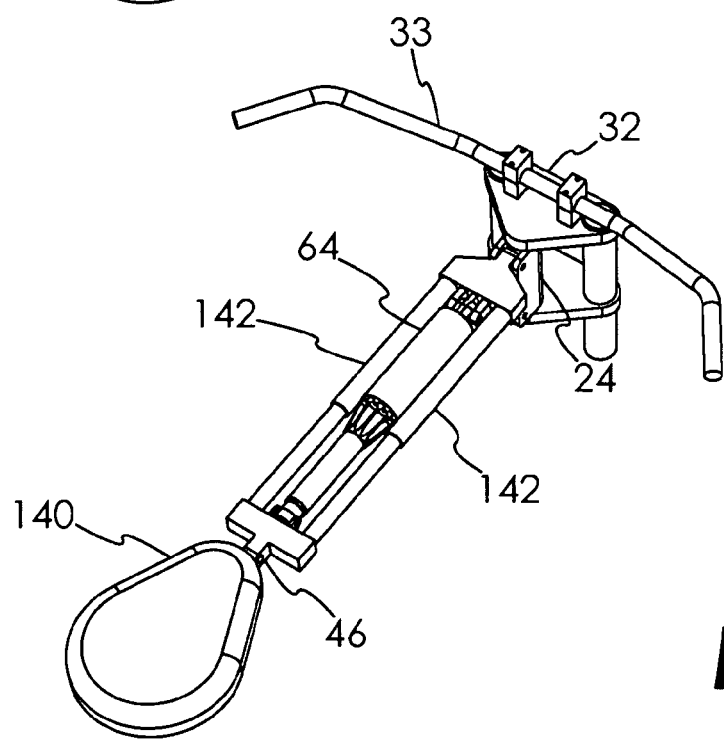
FIG. 12B is a top view of the adjustable backbone of FIG. 11A in an extended position.

Referring to FIGS. 11A and 11B, in another illustrative embodiment of a motorcycle, the backbone 28 portion that extends between an upper portion of the gooseneck 24 and the seat pan area 140 area of the frame includes an actuator 64, and one or more linearly slideable bearings 142 connected in parallel with actuator 64. For example, clevis 120 of frame adapter 46 that is coupled to frame 22 (not shown) can be pivotably coupled to the yoke 96 of actuator 65 and a first end 154 of linear bearings 140, for example, using bushings 144, needle bearings 146, shoulder bolt 148, nut 150 and washers 152. Similarly, an opposite end of the actuator 64, eyelet 94 of rod 92, along with a second end 156 of linear bearing 140 can be pivotably coupled to gooseneck 24 using bushing 144, needle bearings 146, shoulder bolt 148, nut 150 and washers 152. The linear bearings 142 provide additional support and stability for backbone 28 in the length adjusting portion. Referring to FIGS. 12A and 12B, FIG. 12A and 12B illustrate an alternative embodiment for the length adjusting portion of backbone 28 that is similar to that of FIGS. 11A and 11B. FIG. 12A is illustrates the length adjusting portion in a retracted position, and FIG. 12B is illustrated in an extended position.

Figure 13A:
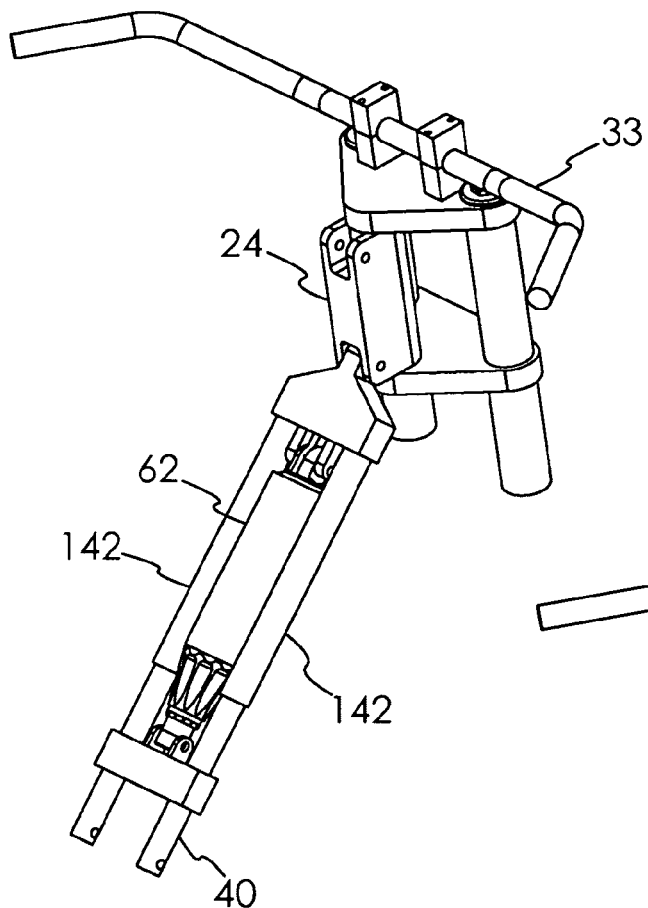
FIG. 13A is a front view of an illustrative embodiment of motorcycle frame having an adjustable downtube with linear bearing supports in a retracted position.
Figure 13B:
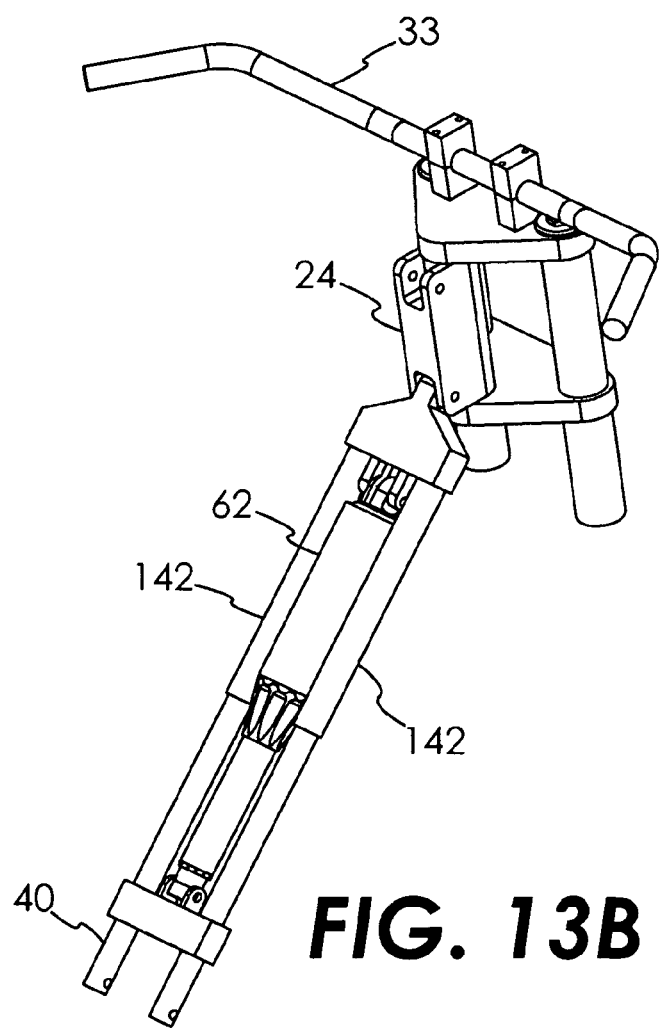
FIG. 13B is a front view of an illustrative embodiment of motorcycle frame having an adjustable downtube with linear bearing supports in a retracted position.

Referring to FIGS. 13A and 13B, a similar arrangement with one or more linear support bearings 142 coupled in parallel with actuator 62 can be used for length adjusting downtubes 26. FIG. 13A illustrates a retracted position and FIG. 13B illustrates an extended position. For the variation of the downtube 26 and backbone 28 shown in FIGS. 11A-13B, the specific arrangement illustrated in FIGS. 11A-13B can be used, or other arrangements that are within the scope of linear support bearings 142 coupled in parallel with a linear actuator 62.

Figure 14:
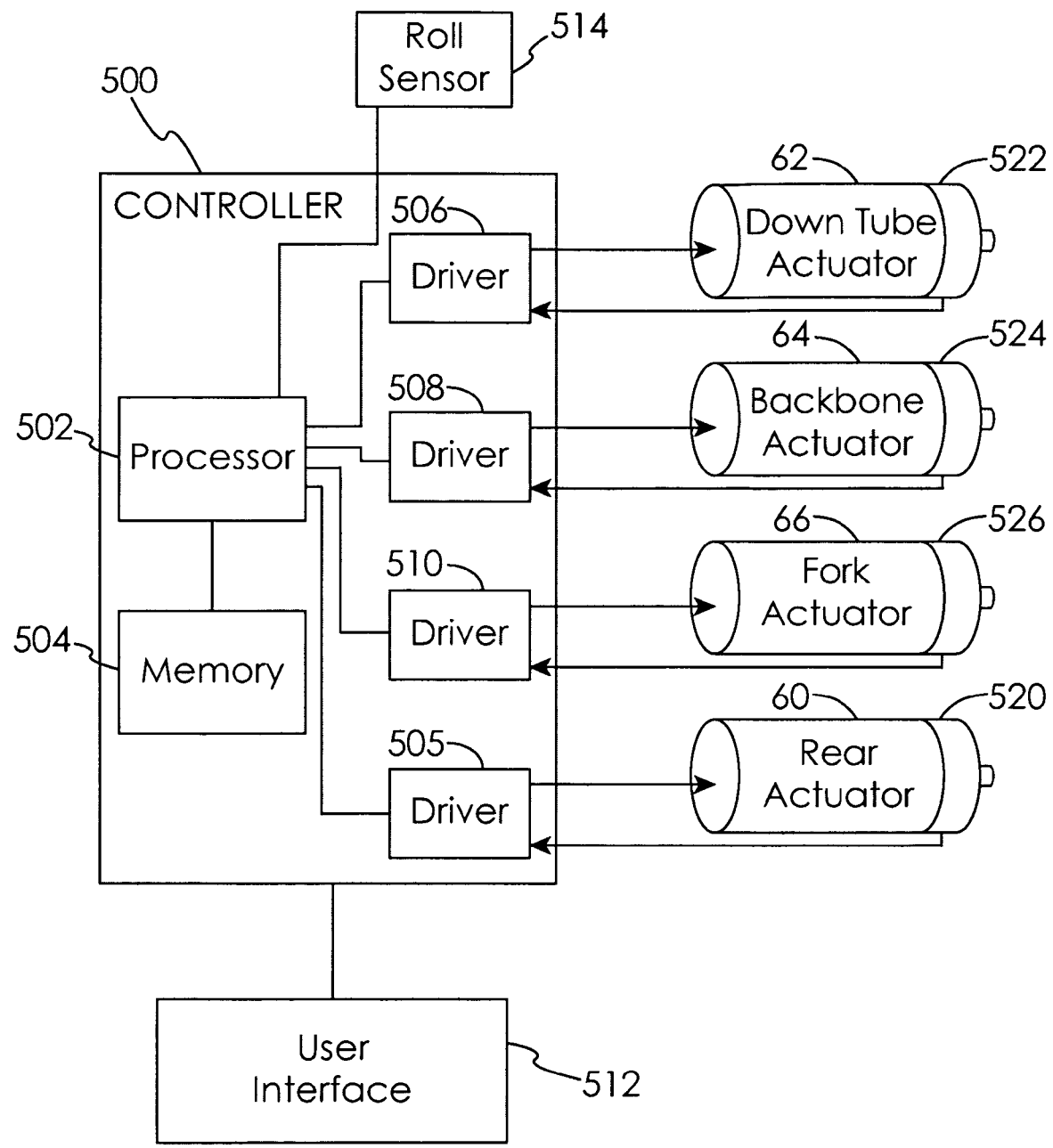
FIG. 14 is a block diagram of an illustrative embodiment of a controller associated with the cycle of FIG. 1 and the system of FIG. 4A.

A controller 500 associated with system 400 is shown in FIG. 14. The controller 500 controls the actuation of rear suspension actuator 60, downtube actuator 62, backbone actuator 64, and fork actuator(s) 66. The controller 500 includes a processor 502, memory 504. Interfaces/drivers 505, 506, 508, and 510 for each respective actuator 60, 62, 64, and 66 are included with or associated with the controller 500. The interfaces/drivers 505, 506, 508, and 510 may also provide receiving of position feedback information for the actuators 60, 62, 64, and 66, for example, from position sensors 520, 522, 524, and 526 associated with each respective actuator 60, 62, 64, and 66. For example, sensors 520, 522, 524, and 526 can be analog, encoder, limit switch, or other types of sensors capable of providing absolute or relative feedback of the position of actuators 60, 62, 64, and 66 or their associated from components. User interface 512 is coupled to controller 500 and provides a human interface for selectively adjusting the actuators 62, 64, and 66. For example, user interface 512 may include a display and switches, or a touch screen, for example mounted on the handlebars. Additionally, a roll sensor 514 that provides indication that the motorcycle is level and not leaning (roll) can be coupled to the controller 500 and utilized to inhibit changes in frame geometry when the motorcycle is not upright. For example, roll sensor 514 can be a mercury switch or other motion/level sensing device.

The Controller 500 may be a logic, PC, or other controller, including a PLC, for example a micro or mini PLC such as the Nano PLC available from GE Fanuc of Charlottesville, Va. Illustrative drivers 520-526 are available from Mecvel of Bologna, Italy, for example MDC2-12V-10A. The controller 500, including drivers 505-510 may be enclosed in a NEMA rated enclosure.

Processor 502 and memory 504 of controller 500 are utilized to provide safety and convenience features relating to the variable geometry of the motorcycle frame. For example, the controller 500 may store predefined combinations of downtube and backbone lengths and rake angles RA, for example 30 predefined frame geometries, for example that provide a variety of chopper, low dragster, and high tallboy frame geometries.

Additionally, the controller 500 may store two favorites of the presets or user-defined frame geometries. For example, the user interface 512 may include a preset select switch (or touchscreen selection) and a store/enter switch that allow selection between, storage of, and recall of preset geometries. Additionally, the controller may be programmed to coordinate movement of the various actuators 60-66 such that the motorcycle remains relatively level and stable during the adjustment of geometry. Additionally, as a safety feature controller 500 may be programmed to prevent adjustment of the frame geometry to a particular or any configuration in the event of specific conditions, for example, cycle 20 not upright, the engine not off, the speed over a particular threshold, the configuration not specified for selection while in motion, the configuration requiring transient through an unsafe geometry, the configuration not being within structural or stability limits, or other such safety considerations.

For example, a transformation during operation mode (TMOD) provided by the controller 500 requires that transformation to a particular configuration not be enabled under operation until the rider has transformed to and from the configuration a threshold number of times with the vehicle upright and not in operation, for example, with the engine off.

A specific TMOD switch may be included with the user interface 512 to facilitate enabling and selecting TMOD and the above and/or additional safety features associated with its use.

One or more switches associated with the user interface 512 may initiate the processor 502 to provide a preset position of or incremental actuation of one of the actuator 60, 62, 64, and 66, for example, an axis select switch and a "+" and "−" rocker switch. Additionally or alternatively, a switch or other user input device associated with the user interface 512 may initiate the processor 502 to provide coordinated actuation of the actuators 60, 62, 64, and 66 to provide a preset of or incrementally adjust one or more of the rake angle RA, gooseneck height H, wheel base WB, and/or rear end height RE. Additionally or alternatively, a switch or other user input device associated with the user interface 512 may initiate the processor 602 to provide coordinated actuation of the actuators 60, 62, 64, and 66 to provide a preset or stored combination of one or more of a particular rake angle RA, gooseneck height H, wheel base WB, and rear end height RE.

Additionally, indicators may provide user information about selections and status of the controller 500 and the frame geometry. For example, indications may include whether a measure of adjustment (length, height, angle, etc), setup mode, level or non-level cycle, TMOD mode, preset mode, and preset number While the actuators 62, 64, and 66 have been disclosed as linear actuators such as electromechanical ball screws, for example operating at 12 VDC already available on a typical motorcycle 20, alternative actuators can be utilized, for example, pneumatic, hydraulic, or other electromechanical actuators.

While the invention has been illustrated and described in detail in the foregoing drawings and description, the same is to be considered as illustrative and not restrictive in character, it being understood that only illustrative embodiments thereof have been shown and described and that all changes and modifications that are within the scope of the claimed subject matter is desired to be protected.

What is claimed is:

1. A motorcycle, bicycle, or three-wheeler frame including an apparatus for adjusting the geometry of the frame, comprising:
    a frame to which a rear wheel may be attached to drive the frame, the frame comprising;
        an engine support,
        a downtube,
        a backbone, and
        a gooseneck to which a front wheel may be attached;
    a length-adjustable front fork rotatable in the gooseneck and to which a front wheel may be attached;
    a first linear actuator associated with the downtube of the frame and fixedly connected to the gooseneck;
    a second linear actuator associated with the backbone of the frame; and
    a third linear actuator associated with the front fork and operable to adjust the length of the front fork;
    wherein the association of the first and second linear actuators with the frame is such that the first actuator is adjustable independently of the second actuator.

2. The apparatus of claim 1, wherein a first end of the first linear actuator is coupled to the gooseneck and a second end of the first linear actuator is coupled to a forward terminal end of a lower portion of the motorcycle, bicycle, or three-wheeler frame.

3. The apparatus of claim 2, wherein a first end of the second linear actuator is coupled to the gooseneck, and a second end of the second linear actuator is coupled to a forward terminal end of an upper portion of the motorcycle, bicycle, or three-wheeler frame.

4. The apparatus of claim 3, wherein the forward terminal end of the upper portion of the motorcycle, bicycle, or three-wheeler frame is formed by cutting and removing a length of the backbone; and the forward terminal end of the lower portion of the motorcycle, bicycle, or three-wheeler frame is formed by cutting and removing a length of the downtube.

5. The apparatus of claim 4, further comprising a pivotable coupling device welded to the forward terminal end of the frame and adapted to couple one of the first and second linear actuators to the pivotable coupling device.

6. The apparatus of claim 1, wherein the second linear actuator is operative to adjust the length of the backbone and the first linear actuator is operative to adjust the length of the downtube.

7. The apparatus of claim 6, further comprising at least one controller adapted to actuate the first and second linear actuator to adjust the height of the gooseneck.

8. The apparatus of claim 6, further comprising at least one controller adapted to actuate the first, second, and third linear actuators such that the rake angle is adjustable.

9. The apparatus of claim 1, wherein the first and second linear actuators include an electro-mechanical screw.

10. The apparatus of claim 1, further comprising a fourth linear actuator associated with a rear portion of the frame such that the height of the rear of the motorcycle, bicycle, or three-wheeler frame is adjustable relative to the roadway.

11. The apparatus of claim 1, further comprising a controller and a user input device, wherein the controller is adapted to:
    coordinate adjustment of the first and second linear actuators to adjust at least one of the height of the gooseneck and rake angle;
    store preset positions of the first and second linear actuators to provide a specific frame geometry;
    select and recall the preset positions and drive the first and second linear actuators to the stored frame geometry.

12. A motorcycle, bicycle, or three-wheeler frame including an apparatus for adjusting the geometry of the frame, comprising:
    a frame to which a rear wheel may be attached to drive the frame, the frame comprising:
    a length adjusting portion of the backbone that is coupled between the gooseneck and an upper portion of the motorcycle, bicycle, or three-wheeler frame;
    a length adjusting portion of the downtube that is coupled between the gooseneck and a lower portion of the motorcycle, bicycle, or three-wheeler frame; and
    means for attachment of a rear wheel frame;
    wherein the length adjusting portion of the backbone and the length adjusting portion of the downtube carry a structural load between the gooseneck and the rear of the frame and wherein at least one of the length adjusting portion of the backbone and the length adjusting portion of the downtube includes at least one linear bearing support coupled in parallel with the respective length adjusting portion.

13. The apparatus of claim 12, wherein the length adjusting portion of the backbone includes a first linear actuator capable of adjusting the length of the backbone and the length adjusting portion of the downtube includes a second linear actuator capable of adjusting the length of the downtube, and further comprising at least one controller adapted to actuate the first and second linear actuators to adjust the geometry of the frame.

14. The apparatus of claim 13, wherein the first and second linear actuators each include an electro-mechanical screw.

15. The apparatus of claim 13, further comprising a user input device, wherein the at least one controller is adapted to:
- coordinate adjustment of the first and second linear actuators to adjust at least one of the height of the gooseneck and rake angle;
- store preset positions of the first and second linear actuators to provide a specific frame geometry; and
- select and recall the preset positions and drive at least the first and second linear actuators to the stored frame geometry.

16. An apparatus for adjusting the geometry of a motorized or non-motorized cycle frame having a gooseneck, comprising:
- a first linear actuator comprising a length of the backbone of the cycle frame;
- a second linear actuator comprising a length of the downtube of the cycle frame; and
- at least one controller located so as to be accessible to a rider of the apparatus and adapted to actuate the first and second linear actuators;
- wherein the first and second linear actuators are adjustable to independently change the lengths of the backbone and downtube.

17. An apparatus for adjusting the geometry of a motorcycle, bicycle, or three-wheeler frame having a front wheel fork, comprising:
- a first linear actuator operable to adjust the rake angle of the front wheel fork;
- a second linear actuator operable to adjust the length of the front wheel fork;
- wherein the first linear actuator is load-bearing and the association of the first and second linear actuators with the frame is such that the first actuator is adjustable independently of the second actuator.

18. The apparatus of claim 17, wherein the frame includes a gooseneck and backbone and:
- a first end of the first linear actuator is coupled to the gooseneck;
- a second end of the first linear actuator is coupled to a forward terminal end of a lower portion of the motorcycle, bicycle, or three-wheeler frame; and
- the backbone is fixed in length and is pivotably coupled to the gooseneck.

19. The apparatus of claim 17, wherein the frame includes a gooseneck and downtube and:
- a first end of the first linear actuator is coupled to the gooseneck;
- a second end of the first linear actuator is coupled to a forward terminal end of an upper portion of the motorcycle, bicycle, or three-wheeler frame; and
- the downtube is fixed in length and is pivotably coupled to the gooseneck.

* * * * *